United States Patent
Ahiska et al.

(10) Patent No.: US 7,893,985 B1
(45) Date of Patent: Feb. 22, 2011

(54) WIDE ANGLE ELECTRONIC CAMERA WITH IMPROVED PERIPHERAL VISION

(75) Inventors: Yavuz Ahiska, Esher (GB); Mark Kenneth Davey, Beckenham (GB); Michael Benjamin Kirsch, Letchworth Garden City (GB)

(73) Assignee: Grandeye Ltd., Guildford, Surrey (GB)

( * ) Notice: Subject to any disclaimer, the term of this patent is extended or adjusted under 35 U.S.C. 154(b) by 1652 days.

(21) Appl. No.: 11/081,080

(22) Filed: Mar. 15, 2005

Related U.S. Application Data

(60) Provisional application No. 60/553,186, filed on Mar. 15, 2004.

(51) Int. Cl.
*H04N 5/225* (2006.01)
*G02B 13/16* (2006.01)

(52) U.S. Cl. .................. 348/335; 348/222.1

(58) Field of Classification Search .......... 348/222.1, 348/240.99, 240.3, 335
See application file for complete search history.

(56) References Cited

U.S. PATENT DOCUMENTS

| | | | |
|---|---|---|---|
| 3,725,563 A | 4/1973 | Woycechowsky | |
| 4,667,236 A | 5/1987 | Dresdner | |
| 4,728,839 A | 3/1988 | Coughlan et al. | |
| 4,763,280 A | 8/1988 | Robinson et al. | |
| 4,821,209 A | 4/1989 | Hempel et al. | |
| 5,027,287 A | 6/1991 | Artigalas et al. | |
| 5,185,667 A | 2/1993 | Zimmermann | |
| 5,321,776 A | 6/1994 | Shapiro | |
| 5,359,363 A | 10/1994 | Kuban et al. | |
| 5,396,284 A | 3/1995 | Freeman | |
| 5,434,617 A | 7/1995 | Bianchi | |
| 5,495,292 A | 2/1996 | Zhang | |
| 5,666,157 A | 9/1997 | Aviv | |
| 5,684,937 A | 11/1997 | Oxaal | |
| 6,049,281 A | 4/2000 | Osterwell | |
| 6,147,709 A | 11/2000 | Martin et al. | |
| 6,215,519 B1 | 4/2001 | Nayar et al. | |
| 6,243,099 B1 | 6/2001 | Oxaal | |

(Continued)

FOREIGN PATENT DOCUMENTS

| EP | 1 341 383 A2 | 9/2003 |
|---|---|---|
| WO | WO 02/062056 A1 | 8/2002 |
| WO | WO02067048 (A3) | 8/2002 |
| WO | WO02093908 (A3) | 11/2002 |
| WO | WO03010599 (A1) | 6/2003 |

OTHER PUBLICATIONS

Comaniciu, D., Ramesh, V., and Meer, P., "Real-Time Tracking of Non-Rigid Objects Using Mean-shift," IEEE Computer Vision and Pattern Recognition, vol. 1 II, 2000, pp. 142-149.

(Continued)

*Primary Examiner*—Gevell Selby
(74) *Attorney, Agent, or Firm*—Robert Groover; Malcolm W. Pipes; Groover & Associates

(57) ABSTRACT

The present inventions provide a system and method for a wide angle camera capable of high resolution peripheral vision. A wide angle lens system distorts the image and conveys it to an image sensor, which converts the image to an electronic signal and conveys it to image processing circuitry. The image processing circuitry corrects the distortion or transforms it to human recognizable image forms. In preferred embodiments, the distortion provides greater resolution of regions of interest and more efficient use of the area of the image sensor.

20 Claims, 5 Drawing Sheets

U.S. PATENT DOCUMENTS

| | | | |
|---|---|---|---|
| 6,344,852 | B1 | 2/2002 | Zhu et al. |
| 6,509,926 | B1 | 1/2003 | Mills et al. |
| 6,545,810 | B1* | 4/2003 | Takada et al. ............... 359/618 |
| 6,724,421 | B1 | 4/2004 | Glatt |
| 6,757,434 | B2 | 6/2004 | Miled et al. |
| 6,763,068 | B2 | 7/2004 | Oktem |
| 2003/0128756 | A1 | 7/2003 | Oktem |
| 2005/0122400 | A1* | 6/2005 | Kochi et al. ............ 348/207.99 |
| 2005/0174437 | A1* | 8/2005 | Iga ......................... 348/222.1 |
| 2005/0259118 | A1* | 11/2005 | Mojaver et al. ............. 345/647 |

OTHER PUBLICATIONS

Y. Yardimci, I. Yilmaz, A. E. Cetin, "Correlation Tracking Based on Wavelet Comain Information," Proceedings of SPIE vol. 5204, San Diego, Aug. 5-7, 2003.

A M. Bagci, Y. Yardimci, A. E. Cetin, "Moving Object Detection Using Adaptive Subband Decomposition and Franctional Lower-Order Statistics in Video Sequences," Signal Processing, 82 (12): 1941-1947, Dec. 2002.

C. Stauffer, W. Grimson, "Adaptive Background Mixture Models for Real-Time Tracking." Proc. IEEE CS Conf. On Computer Vision and Pattern Recognition, vol. 2, 1999, pp. 246-252.

"A System for Video Surveillance and Monitoring," in Proc. American Nuclear Society (ANS) Eighth International Topical Meeting on Robotics and Remote Systems, Pittsburgh, PA, Apr. 25-29, 1999 by Collins, Lipton and Kanade.

Aube, 12th International Conference on Automatic Fire Detection, 2001.

X. Zhou, R. Collins, T. Kanade, and P. Metes, "A Master-Slave System to Acquire Biometric Imagery of Humans at Distance", ACM International Workshop on Video Surveillance, Nov. 2003.

* cited by examiner

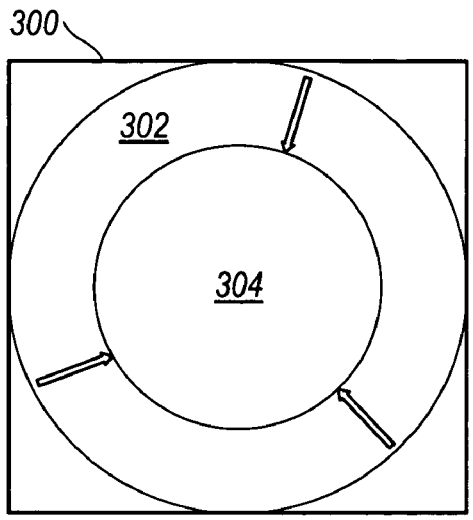
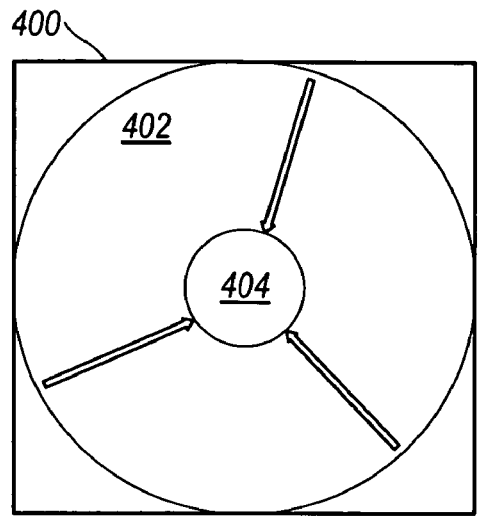
FIG. 3  FIG. 4
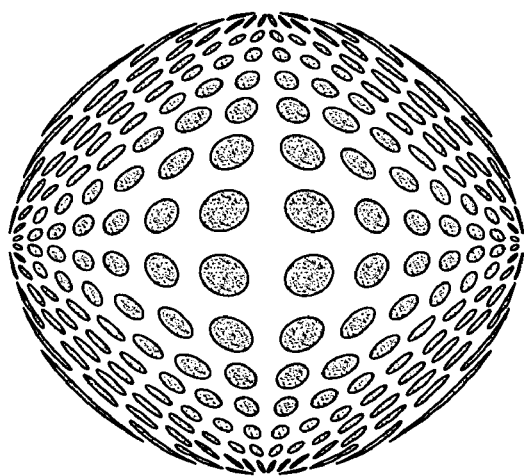
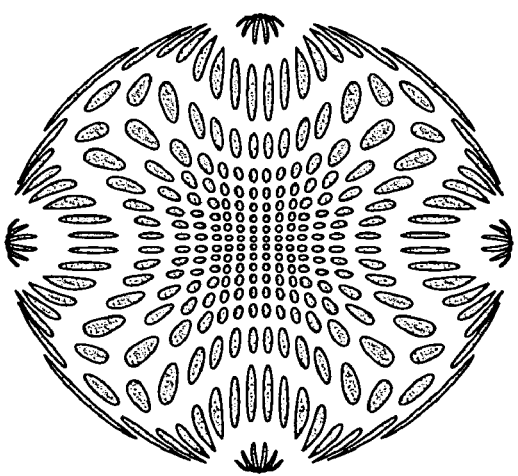
FIG. 5  FIG. 6

WIDE ANGLE ELECTRONIC CAMERA WITH IMPROVED PERIPHERAL VISION

CROSS REFERENCE TO RELATED APPLICATIONS

This application claims priority from provisional patent application 60/553,186, titled "Wide Angle Electronic Camera with Improved Peripheral Vision," filed on Mar. 15, 2004, which is hereby incorporated by reference.

Other applications which relate to the present application, and which are hereby incorporated by reference include:
- U.S. Application Ser. No. 60/467,808, entitled "Wide-Angle Motion Camera with Electronic PTZ."
- U.S. Application Ser. No. 60/467,705, entitled "Correction of Optical Distortion by Image Processing."
- U.S. Application Ser. No. 60/467,588, entitled "Multiple View Processing in Wide-Angle Video Camera."
- U.S. Application Ser. No. 60/467,643, entitled "Multiple Object Processing in Wide-Angle Video Camera."
- U.S. Application Ser. No. 60/467,644, entitled "Method of Simultaneously Displaying Multiple View for Video Surveillance."

FIELD OF THE INVENTION

The present inventions relate generally to wide angle optical systems, and more specifically to a video or still camera system with various image processing that improves peripheral resolution.

BACKGROUND AND SUMMARY OF THE INVENTION

There are many applications for wide angle imaging systems, including "fish eye" lenses or other distorted view imaging systems. For example, wide angle imaging has many applications in security and surveillance, such as close circuit surveillance of property or other monitoring.

When the video camera is used with a conventional fish eye lens, e.g., one with a field of view of 180 degrees, the image output by the camera (and projected onto an electronic imaging device) is distorted, usually circular. The field of view of a camera with a fish eye lens is illustrated in FIG. 1.

FIG. 1 shows a camera 100 with wide angle lens system (such as a 180 degrees fisheye lens). Camera 100 view is broken down into two types of region, including main areas of interest 102 and central region 104. Because of the distortion introduced by the wide angle lens system of camera 100, the main areas of interest 102 are typically warped and occupy the periphery of any optical image output by camera 100. This distortion is typically circular for a circular imaging system, but can be of other shapes, depending on the lens system implemented.

Cameras such as that depicted in FIG. 1 often output an optical signal which is projected or otherwise input to an electronic sensor, such as (but not limited to) a charge-coupled display (hereinafter "CCD") or complementary metal-oxide semiconductor (hereinafter "CMOS") sensor system. Sensors used in a video camera are generally rectangular, so part of the sensor's photo-sensitive area is wasted since it is not illuminated by the circular image projected onto its surface. Alternatively, depending on the projection scheme used, the optical signal may be projected so as to cover most or all of the sensor area, but this results in lost information from the optical signal. These cases are illustrated in FIGS. 2A and 2B.

FIG. 2A shows a system wherein an optical signal is projected onto an image sensor. In this example, most of the area of the sensor 200 is occupied by the lens image circle 202 (though some of the image sensor 200 is not occupied and is thus wasted sensor region 208). In this example, in order to maximize the main region of interest 204 on the sensor 200, some of the lens image 202 is lost, as depicted by lost image region 210. Central region 206 is also shown, and typically comprises the least distorted region of the output optical signal. Main region of interest 204 typically includes more distortion, depending on the lens system used to gather the image.

FIG. 2B shows another situation, wherein the entire lens image circle 202 is projected within the boundaries of image sensor 200. This situation results in a greater wasted sensor region 208 and also requires the region of interest 204 and central region 206 to occupy a smaller area of the sensor 200, meaning the optical image covers fewer detectors or pixels, and thus has lower resolution.

Often, the peripheral region of the field of view is the desired area for surveillance applications that require visibility of a panorama. This corresponds, for example, with regions of interest 204. Because the region of interest may be on the periphery of the total captured image, and because the image was captured with a lens system that introduces greater distortion on the periphery (such as the case with a fisheye lens system or other wide-angle lens system), the region of interest may include high amounts of distortion while covering a relatively small area of the available image sensor region. This results in an inefficient use of the sensor region, lower resolution in the areas of interest, and higher resolution in areas that are of lower interest.

Wide Angle Electronic Camera with Improved Peripheral Vision

The present invention, in one example embodiment, provides a system and method for improving the peripheral imaging of a distorted optical image.

For example, one embodiment relates to the design of a video or still camera with a novel optical system and an electronic image processing system. The optical system captures the image and distorts it such that regions of interest are expanded as they are projected onto a sensor. The electronic image processor then eliminates the distortion by applying a substantially opposite distortion compared with the distortion introduced by some or all of the optical system.

In preferred embodiments, the present innovations are applied to increase resolution of regions of interest, and/or to improve the fit of a non-rectangular image to a rectangular image sensor, for example. Of course, these innovations, as described below, can be used in other shaped optical and sensor implementations.

The increase in resolution provides capability to magnify (by increasing resolution of) one or more regions of interest, while trading off resolution in one or more regions outside the region(s) of interest.

The disclosed innovations, in various embodiments, provide one or more of at least the following advantages:
- improved resolution in regions of interest;
- magnification capability for regions of interest beyond normal magnification capability;
- more efficient use of sensor area;
- capture of all or a greater percentage of a whole image while improving resolution in a specific region or regions.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 3 shows a circular image without peripheral magnification.

FIG. 4 shows magnification of peripheral regions of an image consistent with a preferred embodiment of the present innovations.

FIG. 5 shows an example view of regular patterned object with conventional circular image fish eye lens.

FIG. 6 shows an example of deformation showing magnification of peripheral regions consistent with a preferred embodiment of the present innovations.

DETAILED DESCRIPTION OF THE PREFERRED EMBODIMENTS

Figure 1:
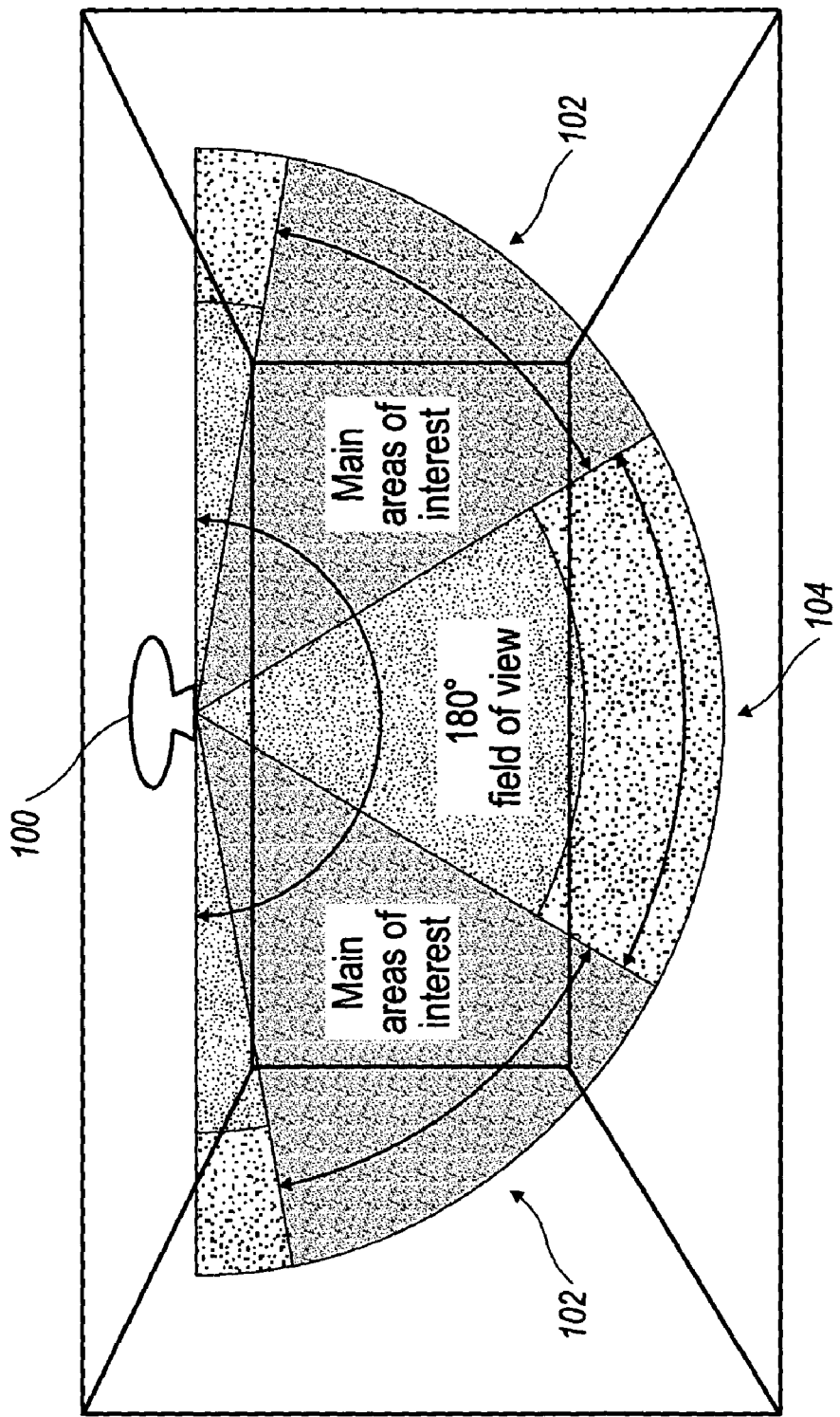
FIG. 1 shows a camera with 180 degree viewing angle.

The numerous innovative teachings of the present application will be described with particular reference to the presently preferred embodiment (by way of example, and not of limitation).

In various embodiments, the present innovations include a system for capturing an image, introducing predetermined first distortion into the captured image so as to alter the shape and/or magnify one or more regions of interest when projected onto a sensor, and a system for introducing second distortion to cancel the first distortion.

In preferred embodiments, the present innovations include an optical imaging system for capturing wide angle images and introducing predetermined first distortion into the captured image so as to alter the shape and/or magnify one or more regions of interest when projected onto a sensor, and an electronic system for introducing second distortion to cancel the first distortion.

In one example embodiment, the present innovations include a novel optical lens and/or mirror system it introduce optical distortion to a region or regions of interest within a wide field of view in order to increase resolution and/or to reshape the image. The resolution of fine detail within the region or regions of interest is increased, since the distortion causes the optical image to impinge upon a larger area of an electronic imaging device, such as a CCD or CMOS sensor. In preferred embodiments, the overall field of view is substantially maintained. The geometric distortion introduced by the novel optical system is preferably later removed or transformed to a different set of distorted but human viewable image forms by electronic processing of the electronic image, using methods such as those disclosed in U.S. provisional patent application No. 60/467,705, "Correction of Optical Distortion by Image Processing," or using transformation methods such as those disclosed in U.S. Pat. No. 6,323,862 by Ford Oxaal, which are hereby incorporated by reference. A plurality of transformations may be applied to a part or total distorted image produced by the optical system to produce a plurality of human viewable image forms. Such transformations may include perspective corrected projections, circular or cylindrical projections for a given field of view. The plurality of images may be produced in multi-window image format. It is noted that other means of distortion and distortion transformation are also applicable and within the contemplation of the present innovations.

In preferred embodiments of the present inventions, there are two categories of distortion that are introduced, either singly or in combination. They are symmetric distortion, such as radial distortion, and asymmetric distortion, such as ellipsoidal or other asymmetric distortion. The types of distortion described herein are only examples, and serve to describe the broader concepts of the present innovations.

FIGS. 3 and 4 show how radial distortion affects a circular image. FIG. 3 shows a circular image, such as that which might be captured by a fish eye lens. Region 302 is a peripheral region, and in this example is the region of interest. Region 304 is the central region. The length of the arrows indicates the degree to which the region of interest 302 covers, for example, a sensor region 300 on which the optical image is projected. Radial distortion, as depicted here, can be introduced, for example, by a parabolic mirror. Other means of introducing symmetric distortion are also within the contemplation of the present innovations.

FIG. 4 shows the same circular image with symmetric, in this case radial, distortion added. In this example, the radial distortion magnifies the region of interest 402 while demagnifying the central region 404.

In these examples, the image of FIG. 4 effectively magnifies the region of interest 402 relative to that same region in FIG. 3, namely region 302. Region 402 covers a larger area of a sensor region 400, and thus has greater resolution. Meanwhile, resolution in central region 302, or 402, has been decreased. Thus, by introducing radial distortion, the region of interest is magnified or increased in resolution, while the central region has been demagnified or decreased in resolution. It is noted that, in this example, the total field of view is substantially maintained.

FIG. 5 shows an image projected onto the electronic image sensor viewing a regular patterned scene by a conventional fish eye lens, which emphasizes the central portion of the scene. The novel optical system described herein introduces a projection distortion illustrated in FIG. 6 which magnifies the required main area of interest (in this example, the periphery). By projecting the main area of interest onto a larger proportion of the electronic image sensor, a higher resolution image of the main area of interest is obtained.

This type of distortion spreads the region of interest over a greater number of sensor photo-sites, which results in greater accuracy of the captured image where required, and lower accuracy of the captured image in areas of lesser interest. Though the periphery is used as an example area of interest in this example description, other areas could also be used.

Asymmetric distortion can also be introduced into the captured image. In such a case, the novel optical system is preferably designed to project a non-circular image onto the electronic imaging sensor in order to illuminate a larger part, or substantially all, of the area of the sensor which would otherwise be unilluminated by a conventional circular image, and/or to capture part of the image which would be projected outside the region of the sensor.

Figure 2A:
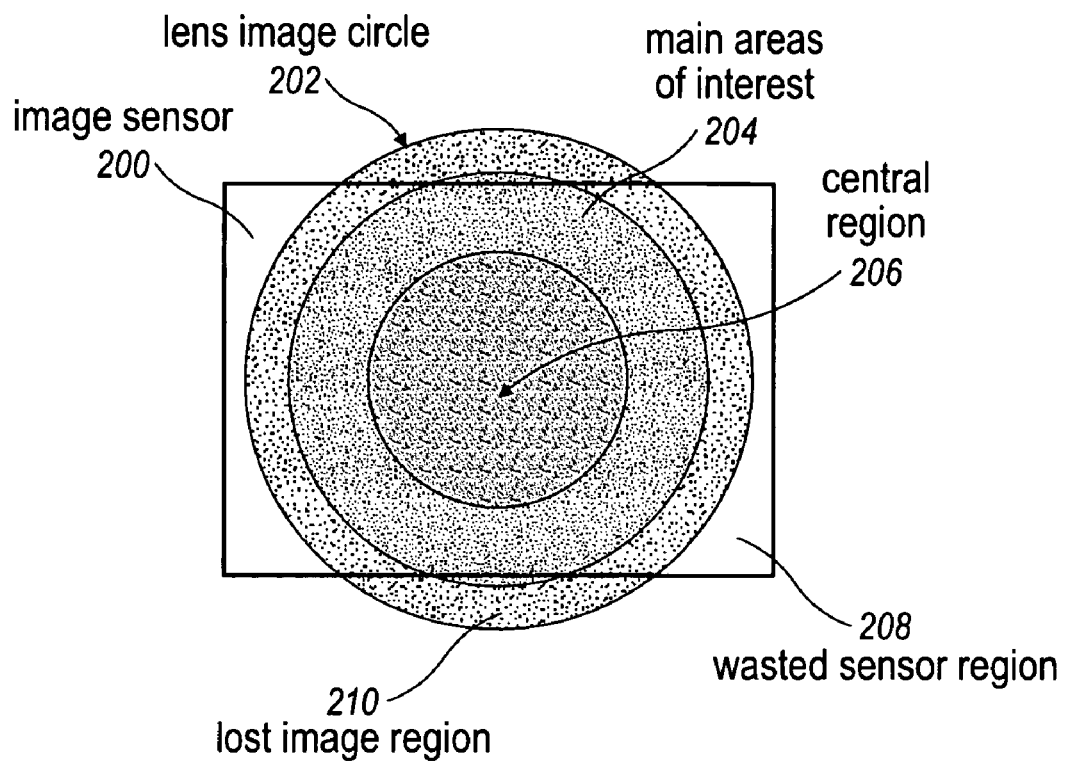
FIGS. 2A and 2B show the projection of circular images onto square sensors.
Figure 2B:
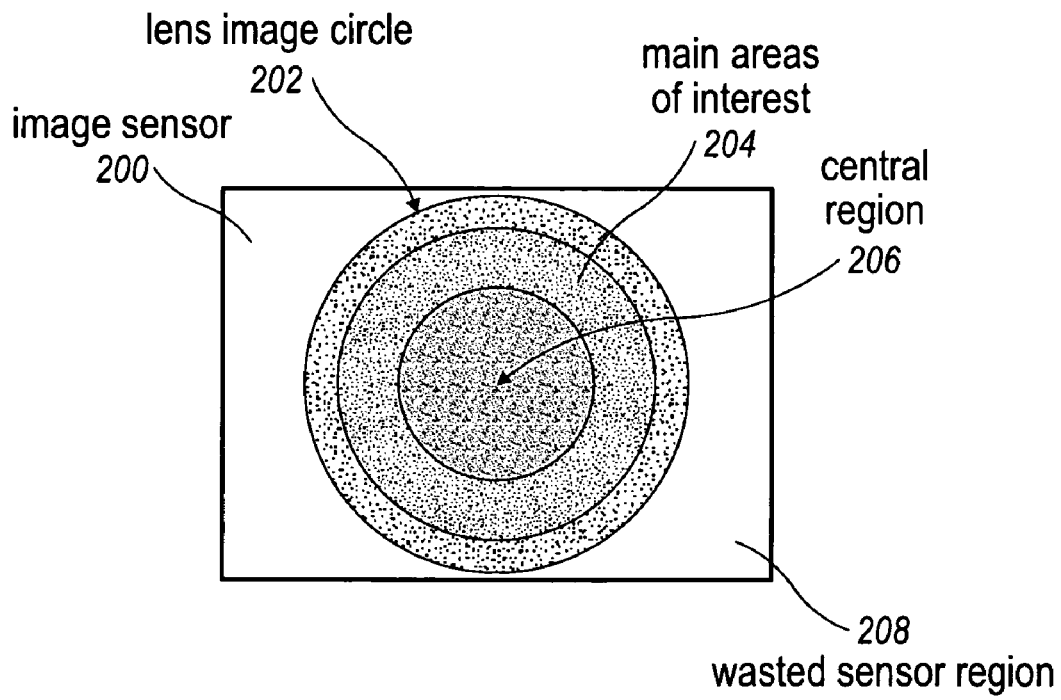

For example, referring back to FIG. 2A, it is noted that part of the projected image is lost because it falls outside the area of the electronic sensor 200. Alternately, in FIG. 2B, though all the image is within the bounds of the sensor 200, there are large unused regions 208 of the sensor 200. Neither case is optimal, and both cases are effectively addressed by implementing the present innovations.

Figure 7:
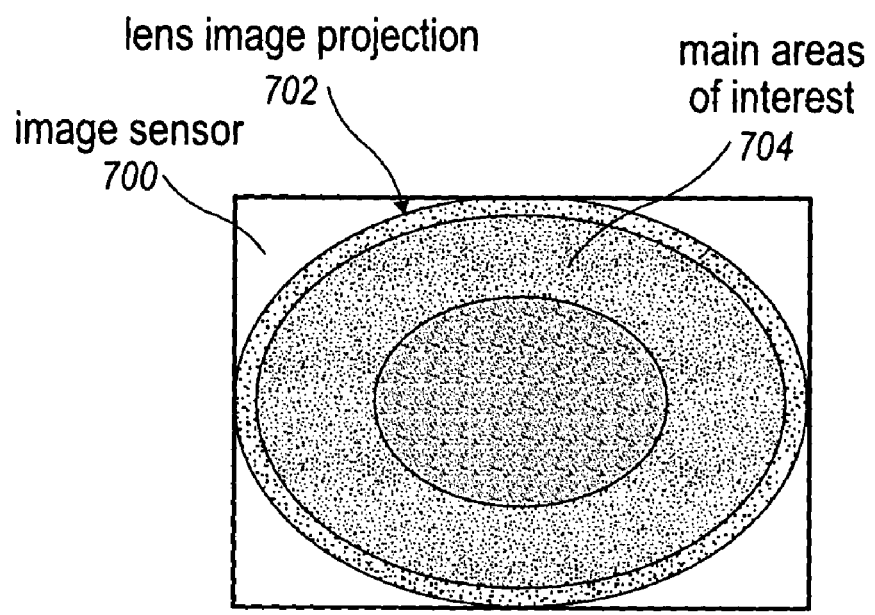
FIG. 7 shows ellipsoidal distortion consistent with a preferred embodiment of the present innovations.

By implementing asymmetric distortion via the optical system of the present innovations, the innovative system projects a non-circular image onto the rectangular area of the electronic sensor or imaging device. The projection can be ellipsoidal or similarly shaped as illustrated in FIG. 7. In this figure, image sensor 700 is rectangular, and what was previously (prior to introducing distortion) a circular image is now distorted into an ellipsoidal image projection 702. Main area of interest 704 is likewise distorted, being part of the same image. It is noted that, in this example, the region of interest 704 can be magnified (as previously described) if the system is designed to perform such a function. The present innovations include both types of distortion, implemented singly or in combination. It is useful to combine both types of distortion to result in increases of the total image resolution and greater increase in resolution of regions of interest. In preferred embodiments of both cases, it is noted, distortion introduced (preferably by the optical system) is corrected (preferably by electronic image processing).

Figure 8:
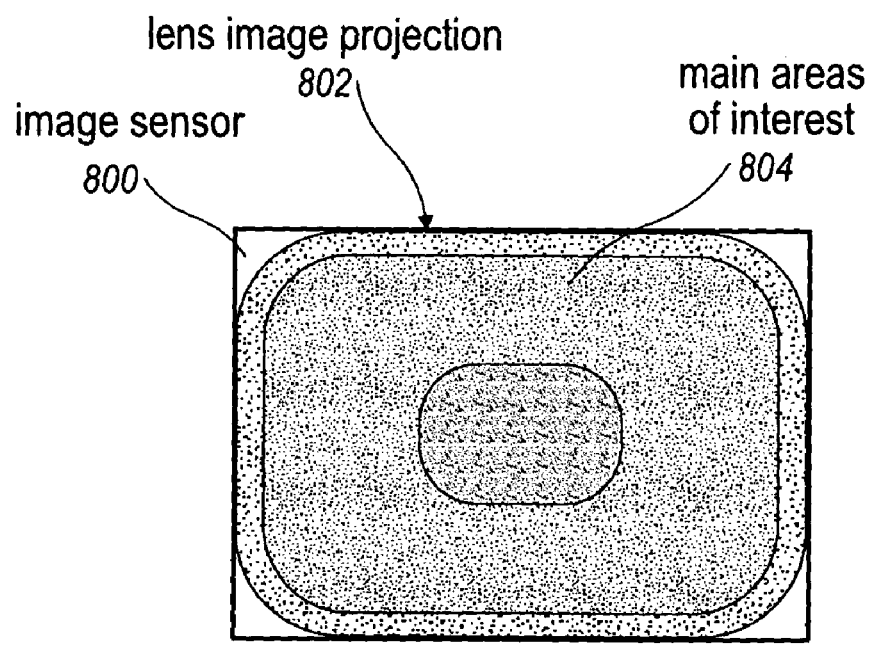
FIG. 8 shows more radical distortion consistent with a preferred embodiment of the present innovations.

FIG. 8 shows even greater amounts of asymmetric distortion. In this example, image sensor 800 is nearly completely covered by the extremely distorted lens image projection 802, including area of interest 804.

Figure 9:
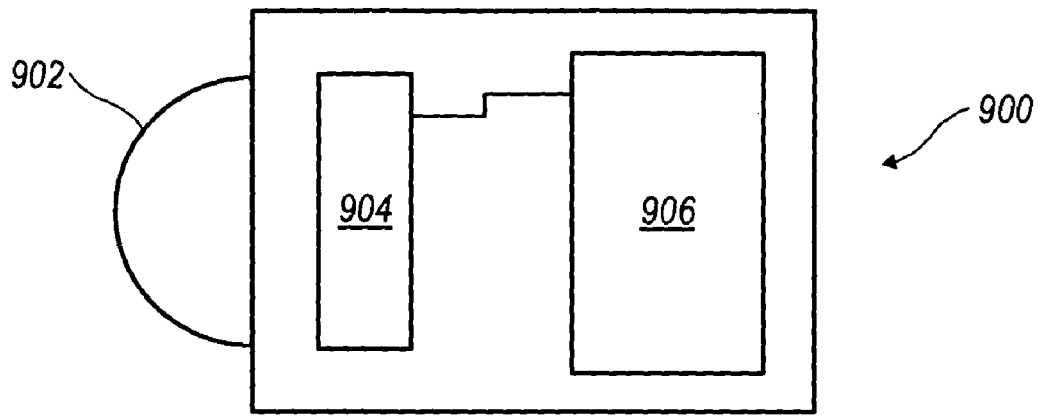
FIG. 9 shows a system consistent with implementing preferred embodiments of the present innovations.

FIG. 9 shows an example system consistent with implementing a preferred embodiment of the present innovations. In this example system 900, a system 902 (preferably an optical system) captures and distorts an image, and the distorted image is projected on (or otherwise sent to) an electronic sensor, such as a CCD or CMOS sensor 904. The resulting electronic image is then transferred to section 906 (preferably electronic image processing circuitry, but which could be implemented as complex optical processing system) which transforms the image in such a way as to reduce or substantially eliminate the distortion introduced by optical system 902.

Wide angle camera image processing circuitry should normally include other capabilities, such as conventional capabilities commonly found in digital photography and video cameras. For example, an image correction pipeline can include debayering, exposure correction, gamma correction, white balance, color correction, sharpening, image filtering, and other manipulation known in the art. the system can also include remote (or local) inputs to select fields of view, for example. In other implementations, such as gamma correction and some image filtering, may be performed after image dewarping.

Figure 10:
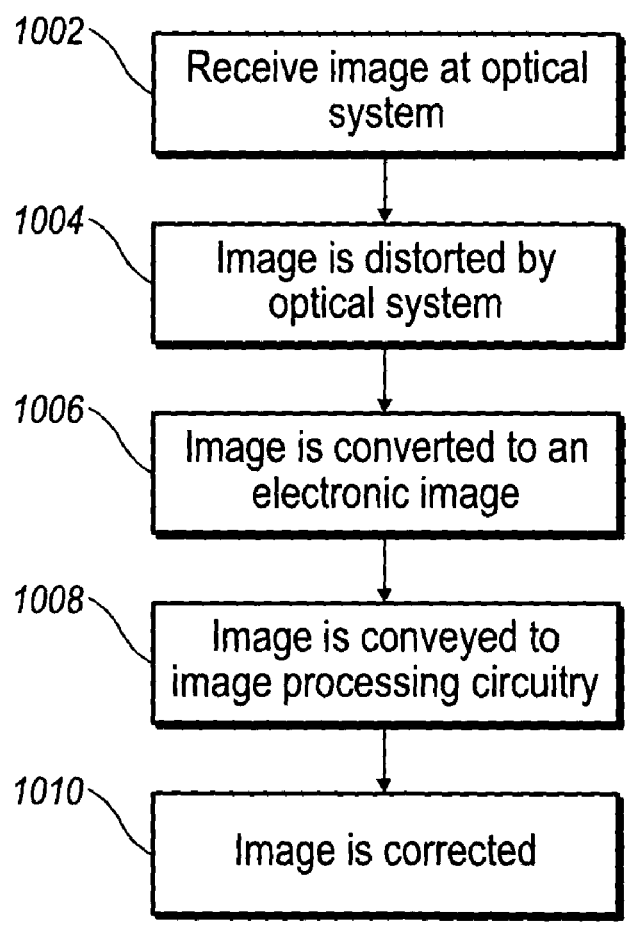
FIG. 10 shows a flowchart with process steps consistent with implementing preferred embodiments of the present innovations.

FIG. 10 shows a simple process flow consistent with implementing a preferred embodiment of the present innovations. First the image is received at the optical system (step 1002). The image is distorted by the optical system (step 1004), resulting in an altered image. In preferred embodiments, the image is distorted so as to increase resolution of regions of interest, to modify the overall shape of the image to more closely correspond to the shape of the sensor, or both. Next, the image is projected onto the sensor and converted into an electronic image (step 1006). This electronic image is conveyed to image processing circuitry (step 1008) which corrects the distortion added by the optical system (step 1010). In preferred embodiments, the image processing circuitry is also capable of other functions, such as debayering, color correction, exposure correction, sharpening, filtering, etc. The final image can be output and made available as an analog signal or a digital signal. Other types of correction can be accomplished at this stage as well, such as perspective correction and projections such as cylindrical projections, spherical projections, etc. The US patent to Ford Oxaal, U.S. Pat. No. 6,323,862 is informative in this area, and is hereby incorporated by reference.

According to a disclosed class of innovative embodiments, there is provided: A wide-angle video camera capable of high resolution peripheral vision comprising a) a wide-angle optical system which performs radial distortion to magnify the peripheral area of the view, b) an image sensor and circuitry to convert the output of said lens to electrical signals suitable for use by an image processing circuit, c) said image processing circuit capable of correcting optical distortions introduced by said wide angle optical system.

According to a disclosed class of innovative embodiments, there is provided: A wide-angle video camera capable of high resolution peripheral vision comprising: a) a wide-angle optical system that projects an image onto an image sensor and circuitry to convert the output of said lens to electrical signals suitable for use by an image processing circuit, b) said optical system to introduce asymmetric distortion to form a non-circular image on said sensor, c) said image processing circuit capable of transforming including but not limited to perspective correcting optical distortions introduced by said wide angle optical system.

According to a disclosed class of innovative embodiments, there is provided: A method of improving peripheral resolution of a captured image, comprising the steps of: receiving an image at a wide angle image capture system, which introduces a first distortion to the image; simultaneously introducing a second distortion to the image; conveying the image to an image sensor, which outputs a signal; conveying the signal to image processing circuitry which substantially transforms the distortions to a human viewable form.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Additional general background, which helps to show variations and implementations, may be found in the following publications, all of which are hereby incorporated by reference:

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A wide-angle video camera capable of high resolution peripheral vision comprising:
   a) a wide-angle optical system which performs radial distortion to provide a distorted non-rectilinear image of a view, in which a peripheral annulus of the image is magnified, and a central area of the image is demagnified, as compared with a fisheye or similar lens with similar field of view and image size;
   b) an image sensor which receives said image and converts it to electrical signals suitable for use by an image processing circuit;
   c) said image processing circuit transforming the optical distortions introduced by said wide-angle optical system to correct the optical distortions and accordingly output a human viewable image with greater resolution in peripheral regions of interest.

2. The device of claim 1 in which a conventional lens and a specially manufactured parabolic mirror is used to achieve said radial distortion.

3. The device of claim 1 in which said wide-angle camera is a still picture camera.

4. The device of claim 1, wherein said distortion distorts the projected image into substantially the same shape as a non-circular image sensor.

5. The device of claim 1, wherein the distortion modifies the projected image to substantially fit within a defined border of a non-circular image sensor.

6. A wide-angle video camera capable of high resolution peripheral vision comprising:
   a) a wide-angle optical system that projects a distorted non-rectilinear image onto a non-circular image sensor, which converts said non-circular image into electrical signals suitable for use by an image processing circuit;
   b) said optical system introducing radially asymmetric distortion to project a non-circular image onto said non-circular sensor, said distortion modifying the image of a view to thereby improve the fit of the projected image to the sensor;
   c) said image processing circuit transforming optical distortions introduced by said wide angle optical system output a human recognizable image with a greater proportion of the sensor area utilized than if a circular image were projected.

7. The device of claim 6 in which a conventional lens and a specially manufactured parabolic mirror is used to achieve said radial distortion.

8. The device of claim 6 in which said wide-angle camera is a still picture camera.

9. The device of clam 6, further comprising: a wide-angle optical system which performs combination of radial and asymmetric distortion to magnify the peripheral area of the view.

10. The device of claim 9 in which a combination of a conventional lens and specially manufactured parabolic mirrors is used to achieve said distortion.

11. The device of claim 9 in which said wide-angle camera is a still camera.

12. A method of improving peripheral resolution of a captured image, comprising the steps of:
   receiving an image at a wide-angle image capture system, which introduces a first distortion to the image so as to project a substantially hemispherical field of view onto a non-circular image sensor;
   simultaneously introducing a second distortion to the image, said second distortion modifying the image projection onto the image sensor to increase total image resolution with a greater increase in image resolution for at least one selected region of interest, and projecting a greater proportion of said image corresponding to the said selected region of interest onto a greater portion of area on said sensor;
   conveying the image to the image sensor, which outputs a signal;
   conveying the signal to image processing circuitry which transforms both the first and second distortions into a human recognizable image output.

13. The method of claim 12, wherein the wide-angle image capture system is an optical system including a special form of fisheye lens.

14. The method of claim 12, wherein the second distortion is a radial distortion to magnify one or more regions of interest.

15. The method of claim 14, wherein the one or more regions of interest comprise a peripheral view.

16. The method of claim 12, wherein the second distortion is an asymmetric distortion to project a non-circular image.

17. The method of claim 12, wherein the second distortion includes both a radial distortion to magnify one of more regions of interest and an asymmetric distortion to project a non-circular image.

18. The method of claim 17, wherein the one or more regions of interest comprise a peripheral region.

19. The method of claim 12, wherein the first distortion warps the substantially hemisphere view into a non-circular projection onto the non-circular image sensor.

20. The method of claim 12, wherein the second distortion warps the view into a non-circular projection corresponding to the shape of the sensor to better fit upon the non-circular image sensor.

* * * * *